3,453,522
AUDIOFREQUENCY TRANSMITTER INCLUDING A LOAD-GUIDED INVERTER AND DIRECT COUPLING FILTER
Rudolf Arthur Ausfeld, Pfaffenhausen, Zurich, Switzerland, assignor to Landis & Gyr, A.G., Zug, Switzerland, a body corporate of Switzerland
Filed Mar. 20, 1967, Ser. No. 624,401
Int. Cl. H02m 5/40
U.S. Cl. 321—4          8 Claims

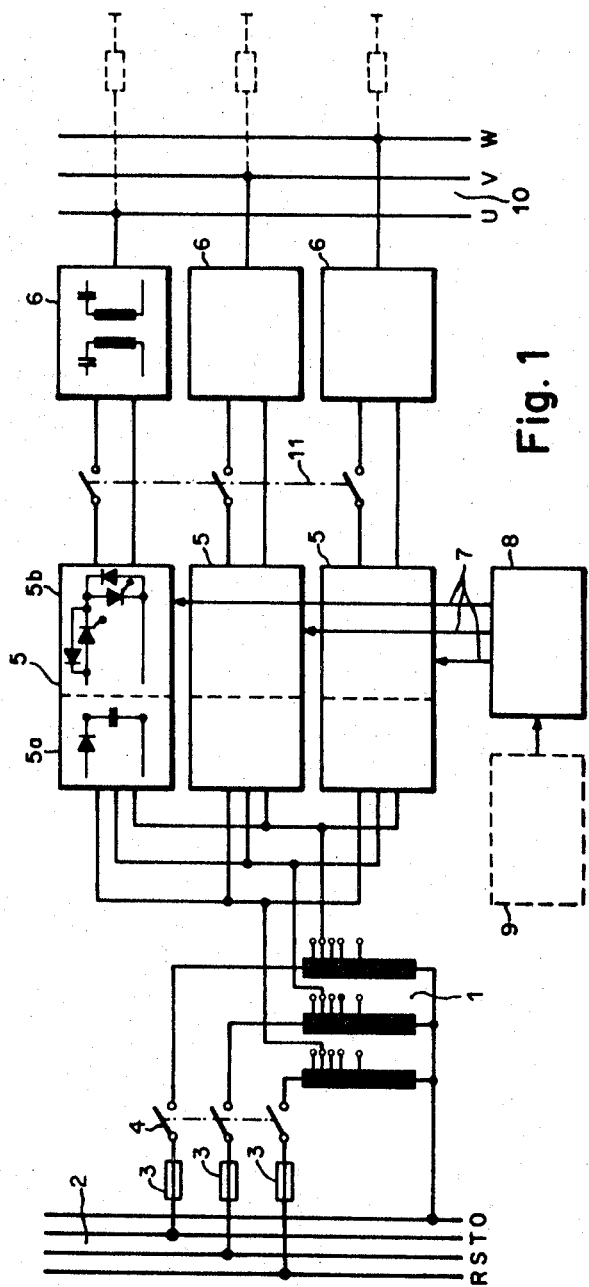
July 1, 1969     R. A. AUSFELD     3,453,522
AUDIOFREQUENCY TRANSMITTER INCLUDING A LOAD-GUIDED
INVERTER AND DIRECT COUPLING FILTER
Filed March 20, 1967     Sheet 1 of 3
INVENTOR.
RUDOLF ARTHUR AUSFELD
BY
ATTORNEYS

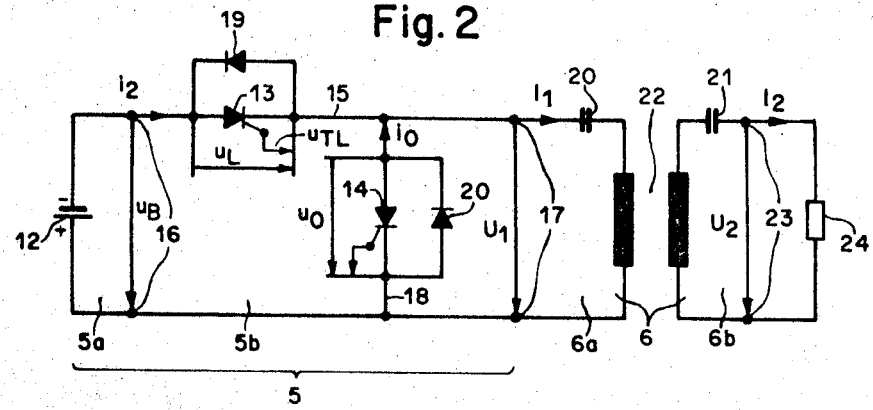
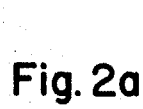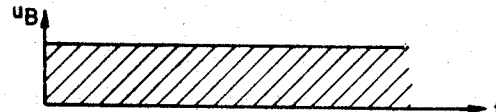
Fig. 2a
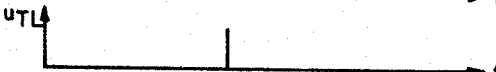
Fig. 2b
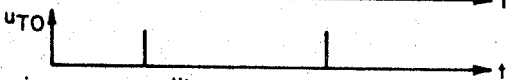
Fig. 2c
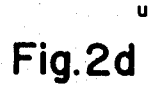
Fig. 2d

Fig. 2e
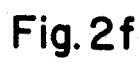
Fig. 2f

Fig. 2g United States Patent Office 3,453,522
Patented July 1, 1969

ABSTRACT OF THE DISCLOSURE

A three-phase audiofrequency generator including a rectifier, a three phase, load-guided inverter, and a coupling filter.

Figure 3:
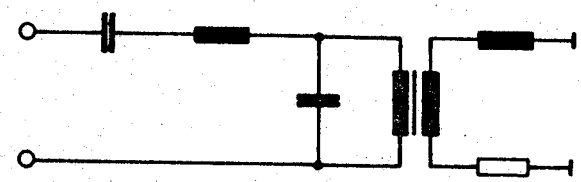

The inverter includes a series and a shunt controlled rectifier. The controlled rectifiers are alternately rendered conductive and an anti-shorting circuit prevents application of triggering pulse to one controlled rectifier while the other is conductive. The coupling filter provides a capacitive load for the inverter so the current leads the voltage by a time period greater than required to extinguish a controlled rectifier. When the transmitter is not operative, the shunt controlled rectifier is used to discharge the capacitive load.

---

This invention relates to audiofrequency transmitters, and more particularly, relates to such transmitters including a load-guided inverter therein.

Known steering transmitters have generally used converters with externally guided three-phase current bridges, commutation capacitors and commutation transformers. Equipment of this type has a series of important disadvantages. The main disadvantage is that extinguishing of the thyratrons or controlled rectifiers by external control and thus electronic sensing of the converter is possible only at the price of additional outlay both in the power portion and in the control portion of the converter. Another disadvantage of such systems is that the commutation capacitors cannot also be used as filter elements. A further drawback is that the commutation capacitors form a shunt to the filters downstream of them and, because of the reactive current flowing through them, cause an increase in current through the controlled rectifiers, thereby reducing the efficiency of the whole system.

In addition the commutation current peaks, which are relatively high in the case of converters with commutation capacitors, tend to shorten the life of the controlled rectifiers particularly at the (for controlled rectifiers) relatively high frequencies generated by the transmitters.

The operating reliability of such transmitters, having converters which contain a three-phase bridge circuit, commutation capacitors and commutation transformers, is in many cases inadequate. Even if only one of the six controlled rectifiers should fail, commutation will no longer be correct and the transmitter will consequently go out of operation. A complete spare three-phase converter must be kept in readiness for such breakdowns and this considerably increases the total costs of such apparatus.

It is fairly difficult to repair converters with a three-phase current bridge circuit since one has to ensure correct interplay between all three phases. These difficulties in the maintenance of the converters make themselves felt in increased operating costs for transmitters using them.

As mentioned above, it has hitherto been the practice to use only converters with three phase bridge circuits, commutation capacitors and commutation transformers. Converters of a different type, particularly the so-called load-guided converters, are known from energy supplying techniques and are free from certain of the above-mentioned disadvantages. For example, they can be controlled from outside with a substantially smaller additional wiring outlay. They have not hitherto been used in audiofrequency transmitters because the technical outlay on switching elements in the power portion is substantially greater than the outlay for converters with an externally guided three-phase bridge circuit.

The problem underlying the invention was therefore to provide an audiofrequency transmitter which was free from the above-mentioned disadvantages of known transmitters with externally guided converters and also free from the disadvantage of involving relatively high wiring outlay in the power portion of the converter such as would be incurred if the load guided converter of known type were used.

According to the invention this is achieved in a single phase or multi-phase audiofrequency transmitter comprising a load-guided converter provided with one inverter per phase, which is load-guided by an associated direct coupling filter on the load side, and with at least one rectifying assembly to feed the inverter in that each inverter contains two groups, each comprising at least one controlled rectifier and one diode connected anti-parallel, that the groups are arranged in the manner of a series arm and a filter-side shunt arm connected between the output of the rectifier and the input of the filter, and that the groups are controlled in such a way that the input of the filter is alternately connected to the output of the rectifier via the series arm and short circuited via the shunt arm.

In such a transmitter with at least one control unit for supplying the triggering impulses for the controlled rectifiers it may be particularly advantageous to provide means for blocking the triggering of the controlled rectifier(s) in the shunt arm of each individual inverter so long as the controlled rectifier(s) in the series arm are still ignited. As means for blocking the triggering of the controlled rectifiers each inverter may advantageously be associated with an AND circuit, the AND circuit being supplied on the input side with the triggering impulses for the controlled rectifiers in the shunt arm and with a conditioning signal resulting from the extinguishing of the controlled rectifiers in the series arm, and connected on the output side with the control electrodes of the controlled rectifiers in the shunt arm. Each inverter may desirably be provided with an impedance connected in the diode line of the group arranged in the series arm and with means for emitting a signal when current flows through the impedance to the associated AND circuit.

Means may advantageously be provided additionally to block the triggering of the controlled rectifier(s) in the series arm of each individual inverter so long as the controlled rectifier(s) in the shunt arm are still ignited. As means for blocking triggering of the controlled rectifiers each inverter may in this case advantageously be associated with two AND circuits, the input side of one being supplied with the triggering impulses for the controlled rectifiers in the shunt arm and with a conditioning signal resulting from the extinguishing of the controlled rectifiers in the series arm while the input side of the other is supplied with the triggering impulses for the controlled rectifiers in the series arm and with a conditioning signal resulting from the extinguishing of the controlled rectifiers in the shunt arm, the output side of one of the AND circuits being coupled to the control electrodes of the controlled rectifiers in the shunt arm and the output side of the other to the control electrodes of the controlled rectifiers in the series arm. In this case it may be an advantage for each inverter to be provided with one impedance in the diode lines of the two groups and with means for emitting a conditioning signal each time current flows through the impedance in the shunt arm to the AND circuit connected on the output side with the control electrodes of the controlled rectifiers in the series arm and each time current flows through the impedance in the series arm to the AND circuit connected on the output side to the control electrodes of the controlled rectifiers in the shunt arm.

Each inverter may be associated with a two-way switch to interrupt triggering of the controlled rectifiers in the series arm in the intervals between transmissions and/or between the emission of signals; the contact arm of the switch will then be connected to the triggering impulse generator and one contact to the control electrodes of the controlled rectifiers in the series arm, while the contact arm and the other contact of the switch are coupled to the two inputs of an additional AND circuit, the output of which is connected to the control electrodes of the controlled rectifiers in the shunt arm.

It is particularly advantageous for the direct coupling filters, at the operating frequency of the controlled rectifiers in the series arm, to have an input impedance with a capacitative component such that, at least when the filter is initially charged, the passages of its input current through zero precedes the associated changing times of the input voltage supplied to the filter by a running time which is always longer than the time taken to extinguish the controlled rectifier, regardless of how complex the terminal resistance of the filter may be.

Figure 4:
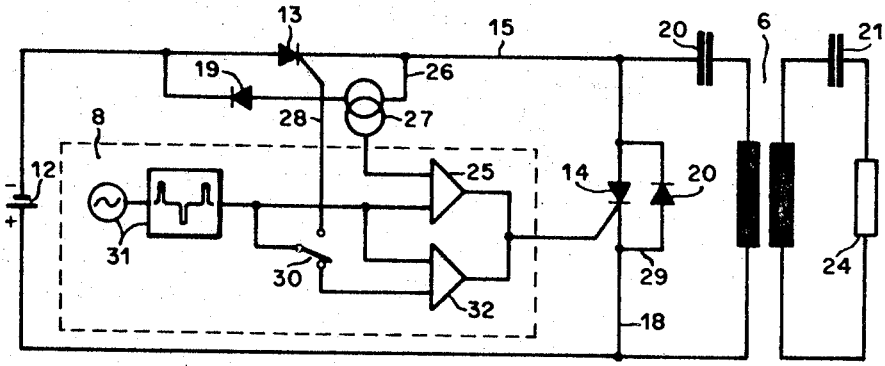

Several illustrative embodiments of the invention are described in greater detail in the following specification which includes the drawings and wherein:

FIG. 1 is a block type diagram of a three-phase audio-frequency transmitter according to the invention, FIG. 1a is a voltage-time graph of the voltage supplied to a FIG. 1 transmitter in one phase of the three-phase system, FIG. 1b is a voltage-time graph of the input voltage at the inverter, FIG. 1c is a voltage-time graph of the input voltage at a direct coupling filter, FIG. 1d is a voltage-time graph of the output voltage of a direct coupling filter or the output voltage of the FIG. 1 transmitter in one phase, FIG. 2 shows a theoretical circuit of an inverter and its associated direct coupling filter in the FIG. 1 transmitter, FIG. 2a is a voltage-time graph of the DC voltage at the input of the inverter, FIG. 2b is a voltage-time graph of the triggering impulses fed to the controlled rectifier in the shunt arm, FIG. 2c is a voltage-time graph of the triggering impulses fed to the controlled rectifier in the series arm, FIG. 2d is a time graph of the voltage (continuous line) and current (broken line) in the series arm, FIG. 2e is a time graph of the voltage (continuous line) and current (broken line) in the shunt arm, FIG. 2f is a time graph of the voltage (continuous right angled line) and current (broken line) at the filter input and of the fundamental wave of said voltage (continuous sinusoidal line), FIG. 2g is a voltage-time graph of the voltage at the output of the filter, FIG. 3 shows a different theoretical layout for the direct coupling filter and FIG. 4 shows a further theoretical circuit for an inverter with means for blocking the triggering of the controlled rectifier in the shunt arm before the controlled rectifier in the series arm has been extinguished.

In the three-phase audio frequency transmitter shown diagrammatically in FIG. 1 three phase current is supplied to the three phase transformer 1 from the three phase system 2 by way of fuses 3 provided to protect the latter, and main switch 4.

To make the transmitter as efficient as possible the transformer 1 is in the form of an auto transformer and is provided with tappings to adjust the transmitting level.

Three converter units 5 each comprising a rectifier portion 5a and an inverter portion 5b are fed by way of the transformer 1. The portions 5a are constructed in known manner as multi-phase rectifiers so need no further explanation. They may, for example, each contain six diodes which are combined in threes to form Y's; the DC output bridged over with a charging capacitor then lies between the neutral points of the two diode Y's and the phase connections of the two Y's are coupled to the secondary side phase connections of the transformer 1.

The basic construction of the inverter portions 5b and direct coupling filters 6 connected thereto is shown in FIGS. 2 to 4 and will be further explained below.

The inverter portions 5b convert the direct current supplied by the rectifier portion 5a into an audiofrequency alternating current, the fundamental frequency and phase position of this current being determined by the frequency and phase position of the triggering impulses, which are supplied by way of control lines 7 from the control unit comprising the control instrument 8 and the automatic transmitter 9. A predetermined impulse-sensing program is generally fed to the automatic transmitter 9, after which the control instrument 8 is acted on in such a way that triggering impulses are emitted at the control lines 7 for the duration of each control impulse supplied by the automatic transmitter 9 but no triggering impulses are emitted in the intervals between control impulses.

The sequences of trigger impulses emitted by the instrument 8 at the various control lines 7 are dephased from one another in such a way that the audiofrequency AC voltages emitted by the various converter units 5 are each offset from one another by 120° or, in time, by one third of the vibrating time of their fundamental wave.

The fundamental wave is filtered out of the audiofrequency AC voltages emitted by the converter units 5 by the associated direct coupling filters 6. The at least substantially sinusoidal audiofrequency AC voltages emitted by the filter output and dephased from one another by 120° are then superimposed on the low frequency AC voltage of the medium or high voltage network 10.

FIGS. 1a to 1d are graphs of the voltages at various places in the converter system. The switch 11 between the converter units 5 and the direct coupling filters 6 serves to disconnect the unit 5 from the network 10 in intervals between transmissions and is coupled to the main switch 4.

FIG. 2 shows the circuit of a converter unit 5. For the sake of simplicity the rectifier portion 5a has been replaced by a battery 12. The inverter portion 5b of the converter unit 5 contains two controlled rectifiers 13 and 14, of which one is arranged in the series arm 15 of the quadripole located between the rectifier output 16 and the filter input 17 and forming the inverter, while the other controlled rectifier is arranged in the shunt arm 18 of the said quadripole on the filter side. Diodes 19 and 20 are arranged anti-parallel with the two controlled rectifiers 13 and 14, respectively.

Connected to the output of the inverter 5b is the direct coupling filter 6 constructed as a quadripole in a T-system; its series arms on the input and output side contain capacitors 20 and 21 respectively while its shunt arm contains a transformer 22. The output 23 of the filter is terminated by a load impedance 24, which in FIG. 1 is formed by the complex resistance which can be measured at the feed-in point between two phase lines of the network 10.

The way in which the converter unit 5 and associated filter 6 operate will be further explained below by reference to FIG. 2 and to the voltage-time and current-time graphs in FIGS. 2a to 2g.

When the controlled rectifier 13 is triggered, current $I_1$ flows in a positive direction through the primary circuit 6a of the filter 6 until the voltage at the capacitor 20 has reached a maximum. The size of the filter 6 is such that overshooting takes place. As a result of the overshooting the maximum voltage at the capacitor 20 is higher than the feeding voltage $u_B$ supplied by the rectifier portion 5a symbolized by the battery 12, so that the filter input current $I_1$ changes direction and thus starts a reflux of current. In this way the controlled rectifier 13 is automatically re-extinguished. The reflux current flows through the diode 19. For the whole time while the current is flowing through the series arm 15 substantially the full DC voltage $u_B$ provided by the rectifier portion 5a is supplied to the filter input 17, since the voltage drop at the controlled rectifier 13 and the diode 19 while the current is passing through these elements is negligible. The timing of the current $i_L$ in the series arm 15 is shown in FIG. 2d and the timing of the voltage $u_Q$ at the filter input by the graph in FIG. 2e.

When the controlled rectifier 13 is extinguished the controlled rectifier 14 in the shunt arm 18 is triggered. From this moment onward the capacitor 20 discharges via the controlled resistor 14 and the diode 19 is blocked. In the primary circuit 6a of the filter 6 current now flows in a negative direction until the voltage at the capacitor 20 has reached a minimum. At this moment the filter input current $I_1$ again changes direction and flows once more in a positive direction.

The controlled rectifier 14 is consequently extinguished and the diode 20 takes over the current. All the time the current is flowing through the controlled rectifier 14 and diode 20 the voltage at the filter input is almost zero, for the voltage drop at the controlled rectifier 14 and diode 20 while the current is flowing through these elements is negligible. The timing of the voltage $u_Q$ at the filter input 17 and that of the current $i_Q$ flowing through the shunt arm 18 is shown in FIG. 2e.

Once the controlled rectifier 14 has been extinguished and the current starts flowing through the diode the controlled rectifier 13 is retriggered and the cycle is repeated.

The alternate triggering of the controlled rectifiers 13 and 14 at equal intervals produces a square voltage at the filter input ($u_Q$ in FIG. 2f). This is substantially equal to the DC voltage $u_B$ supplied by the rectifier portion 5a after the triggering of the controlled rectifier 13 and approximately zero after the triggering of controlled rectifier 14.

The triggering sequence of controlled rectifiers 13 and 14 is selected so that the frequency of the fundamental wave of the said square voltage is equal to the audio-frequency to be generated by the transmitter. The stages at which the fundamental wave of the said square voltage passes through zero coincide with the triggering times. The triggering times of controlled rectifier 13 are determined by the triggering impulses $u_{TL}$ and those of controlled rectifier 14 by impulses $u_{TO}$, the timing of which is shown in FIGS. 2b and 2c.

Of the square voltage $u_Q$ present at the filter input 17 the filter 6, by virtue of its filtering action, transmits virtually only the fundamental wave $U_1$ (see FIG. 2f), so that the filter output 23 emits an at least substantially sinusoidal AC voltage $u_2$ (see FIG. 2g) with the audio-frequency to be generated by the transmitter.

If the converters 5 are to operate without trouble, the changes of direction of the currents $i_L$ and $i_Q$ in the series arm 15 and shunt arm 18 of the inverter 5b and the consequent extinguishing of the controlled rectifiers 13 and 14 must always precede the triggering of the controlled rectifier in the other arm; for if the controlled rectifier in one arm is triggered before the controlled rectifier in the other arm both controlled rectifiers will be conductive simultaneously and the rectifier 5a short circuited.

To prevent such simultaneous conduction of both controlled rectifiers 13 and 14 the filter 6 must, at the following frequency of the triggering of the controlled rectifier in the series arm, have an input resistance with a capacitative component such that the passages of the filter input current $I_1$ through zero precede the associated changing times of the filter input voltage $u_Q$ by a running time (see FIG. 2f), the time being longer than the extinguishing time of the controlled rectifiers 13 and 14 at any actually possible final impedance 24 of the filter 6. In contrast to an automatic transmitter, therefore, the converter units 5 cannot be coupled to the network 10 just with any direct coupling filter, for the conveyors 5 and associated filters 6 are adapted to one another and form a functional unit.

FIG. 3 shows the basic circuit for another possible embodiment of the filter. The FIG. 3 filter is connected in a T-system like the filter 6 in FIG. 2 but has a series resonance circuit in the series arm on the input side and a parallel resonance circuit in the shunt arm. The load on the output side is inductive. Filters of this construction may also be used as direct coupling filters instead of the filter 6 illustrated in FIG. 2.

Even if the above conditions for the input impedance of the filter 6 are fulfilled it may happen, in the case of abnormal drops in load e.g. while the filter is swinging in or building up, that the extinguishing of the controlled rectifier in the series arm has not yet taken place or is not yet concluded by the time the controlled rectifier in the shunt arm is rendered conductive. For this reason it is desirable to take additional safety measures in order to prevent the DC voltage source 12 from being short circuited when the filter is building up. FIG. 4 shows a converter unit which corresponds to that in FIG. 2 except that means are provided for blocking the triggering of the controlled rectifier 14 in the shunt arm 18 so long as the controlled rectifier 13 in the series arm 15 is still conductive.

These means comprise an AND circuit 25 which is connected in the control line for supplying triggering impulses to the controlled rectifier 14 in the shunt arm 18 and which allows the triggering impulses for the controlled rectifier 14 to pass only when a signal is sent to it by the current transformer 27 included in the line 26 of the diode 19. Such a signal is given off by the transformer 27 only when the diode 19 is energized and the controlled rectifier 13 in the series arm 15 consequently extinguished. In addition, means (not shown in FIG. 4) can of course be provided to block the triggering of the controlled rectifier 13 in the series arm 15 so long as the controlled rectifier 14 in the shunt arm 18 is still conductive. These means, like the means shown in FIG. 4 for blocking ignition of the controlled rectifier in the shunt arm, may comprise an AND circuit and a current transformer, in which case the AND circuit should be connected in the triggering line 28 of the controlled rectifier 13 and the current transformer should have its primary side included in the line 29 of the diode 20 and its secondary side connected to the free input of the AND circuit. Generally, however, such additional means for blocking ignition of the controlled rectifier in the shunt arm are necessary only when conditions for connecting the transmitter the unusual, e.g. when it has to be connected to networks suffering from frequent and severe disturbances.

In the intervals between the signal impulses with which the automatic transmission means 9 (FIG. 1), acting through the control instrument 8 (FIG. 1), controls the emission of signals by the transmitter triggering of the controlled rectifier 13 in the series arm 15 of each individual inverter is interrupted. This is done by means of a switch 30 arranged in the control instrument 8 and controlled by the automatic transmission means 9; FIG. 4 shows it symbolically as a mechanical switch although it may of course be an electronic one.

As shown in FIG. 4, the switch 30 is desirably a two-way switch in which the contact arm is connected to the control electrode of the controlled rectifier 13 in the series arm 15, the contact arm and the other contact being coupled to the two inputs of an additional AND circuit 32, the output of which is connected to the control electrode of the controlled rectifier 14 in the shunt arm 18.

In this way the controlled rectifier 14 in the shunt arm 18 is ignited even in the intervals between the emission of signals by the transmitter, thereby ensuring that the capacitor 20 is satisfactorily discharged in such intervals. This discharge is desirable in order to obtain defined starting conditions for the building up process of the filter 6, which takes place at the beginning of each signal emission; conditions under which even during the building up process the passages of the filter input current $I_1$ through zero precede the associated changing times of the filter input voltage $u_Q$ by a running time which at any given load impedance 24 of the filter 6 is definitely longer than the time taken to extinguish the controlled rectifiers 13 and 14; in other words, so as to create starting conditions for the building up processes of the filter in which, even during this process, it is quite impossible for the DC voltage source 12 to be short circuited by the controlled rectifiers 13 and 14.

The audio frequency transmitters according to the invention, described above by way of example, have a series of advantages over known transmitters with externally guided converters. In particular, transmitters according to the invention allow for electronic sensing without additional wiring outlay in the power portion, for at the end of the signal emission only the triggering lines of the controlled rectifiers in the series arms need be interrupted (in FIG. 4 e.g. by means of the switch 30). Capacitors used exclusively for commutation purposes are not required as the above mentioned capacitative component of the input resistance of the filters is obtained by making the filter elements a suitable size. Apart from the advantage of small industrial outlay, the absence of commutation capacitors brings the further advantage that— on the assumption that the maximum current load capacity of the controlled rectifiers is to be fully exploited—a higher starting power can be achieved with transmitters according to the invention than was possible with known transmitters provided with commutation capacitors. This is because in transmitters according to the invention the entire current flowing through the controlled rectifiers is led to the filters and through these to the output, whereas in known transmitters provided with commutation capacitors part of the admissible maximum current of the controlled rectifiers has to be led to the capacitors, so that a correspondingly smaller current may be transmitted to the filters and through these to the output. A further advantage of the transmitters according to the invention is that no commutation current peaks occur since commutation takes place in the region where the current passes through zero. This greatly lengthens the life of the controlled rectifiers. Another important advantage of the invention is that if operating trouble is caused by the failure of a controlled rectifier, only one converter unit has to be exchanged. While this is being done the transmitter can continue to emit signals through the other two intact converter units. Thus the failure of a controlled rectifier does not necessarily lead to an interruption in transmission as it does in known transmitters. The cost of a converter unit to be kept ready for use if such trouble occurs is far less than the cost of the complete three-phase spare converter which has to be kept in reserve with conventional transmitters. In addition to these specific advantages, transmitters according to the invention have the general advantage of very simple construction, which makes them extremely reliable to operate.

While several illustrative embodiments have been described in detail, it should be obvious that these embodiments do not exhaust the possible combinations and variations within the scope of this invention.

I claim:
1. An audio frequency transmitter comprising
a rectifier circuit for providing a source of DC supply;
a load-guided inverter connected to said rectifier circuit;
a direct coupling filter means coupled between said inverter and the load impedance for passing a selected audio frequency signal and for providing a capacitive loading for said inverter regardless of load impedance;
said load-guided inverter including
a first controlled rectifier connected in series between said source and said coupling filter,
a second controlled rectifier connected in shunt across said coupling filter, and
triggering circuit means connected for alternatively rendering said controlled rectifiers conductive,
said direct coupling filter means providing a capacitive loading for said inverter being operative to commutate said controlled rectifiers by tending to reverse the direction of current flow through the conductive controlled rectifier.

2. A transmitter according to claim 1 wherein said load-guided inverter further includes a diode connected in parallel with each of said controlled rectifiers to develop a potential for extinguishing the associated controlled rectifier when the direction of current flow is reversed by said capacitive loading provided by said direct coupling filter.

3. A multi-phase transmitter system according to claim 1 further comprising a multi-phase power source and a multi-phase audiofrequency transmitter wherein each phase of said system includes a rectifier circuit, a load-guided inverter and a direct coupling filter interconnected as set forth in claim 1.

4. A transmitter according to claim 1 wherein said direct coupling filter, at the operating frequency of said inverter as determined by said triggering circuit means, provides a capacitive load for said inverter sufficient so that during the initial charging of said capacitive load the current will lead the voltage by a time at least equal to the time required to extinguish said controlled rectifiers in said inverter.

5. An audiofrequency transmitter comprising
a rectifier circuit for providing a source of DC supply;
a load-guided inverter connected to said rectifier circuit;
a direct coupling filter coupled between said inverter and the load impedance;
said load-guided inverter including
a first controlled rectifier connected in series between said source and said coupling filter,
a second controlled rectifier connected in shunt across said coupling filter;
a diode connected in parallel with each of said controlled rectifiers to develop a potential for extinguishing the associated controlled rectifier,
triggering circuit means connected to said controlled rectifiers for alternately rendering said controlled rectifiers conductive, and
anti-shorting circuit means coupled to one of said controlled rectifiers and operatively coupled between said triggering circuit means and the other controlled rectifier to block application of triggering pulses thereto at least until said one controlled rectifier is extinguished, and
wherein said anti-shorting circuit includes an AND circuit; an impedance connected in series with the diode associated with said one controlled rectifier to supply, to one input of said AND circuit, a signal indicating when said one controlled rectifier is extinguished; said triggering circuit means being coupled to the control element of said other controlled rectifier via said AND circuit when said one controlled rectifier is extinguished.

6. A transmitter according to claim 5 wherein said one controlled rectifier is said first controlled rectifier connected in series with said coupling filter and said other controlled rectifier is said second controlled rectifier connected in shunt across said coupling filter.

7. A transmitter according to claim 5 wherein said one controlled rectifier is said second controlled rectifier connected in shunt across said coupling filter and said other controlled rectifier is said first controlled rectifier connected in series with said coupling filter.

8. An audiofrequency transmitter comprising:
a rectifier circuit for providing a source of DC supply;
a load-guided inverter connected to said rectifier circuit;
a direct coupling filter coupled between said inverter and the load impedance;
said load-guided inverter including
   a first controlled rectifier connected in series between said source and said coupling filter,
   a second controlled rectifier connected in shunt across said coupling filter;
   a diode connected in parallel with each of said controlled rectifiers to develop a potential for extinguishing the associated controlled rectifier,
triggering circuit means connected to said controlled rectifiers for alternately rendering said controlled rectifiers conductive,
circuit means for applying triggering pulses from said triggering circuit means to said second controlled rectifier when said transmitter is inoperative, and
circuit means coupled to said first controlled rectifier and connected to block the application of triggering pulses from said triggering pulse generator to said second controlled rectifier at least until said first controlled rectifier is extinguished when said transmitter is operative.

References Cited

UNITED STATES PATENTS

| 2,294,388 | 9/1942 | Dawson | 321—44 |
| 2,429,652 | 10/1947 | Terman | 333—77 X |
| 2,934,722 | 4/1960 | Van Anrooy | 333—77 X |
| 3,129,374 | 4/1964 | Relations et al. | 321—45 X |
| 3,271,654 | 9/1966 | Schlabach | 321—5 |
| 3,303,405 | 2/1967 | Schwarz | 321—2 |
| 3,332,001 | 7/1967 | Schwarz | 321—11 |

JOHN F. COUCH, *Primary Examiner.*

W. H. BEHA, JR., *Assistant Examiner.*

U.S. Cl. X.R.

321—5, 11, 45